H. P. Gengembre,
Oil Tank.
N° 34,462. Patented Feb. 18, 1862.
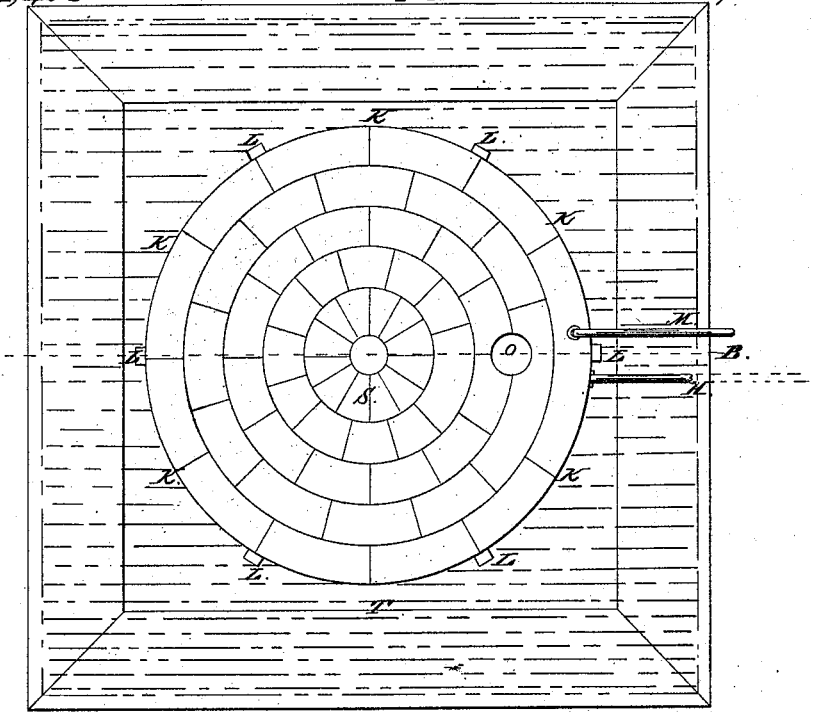
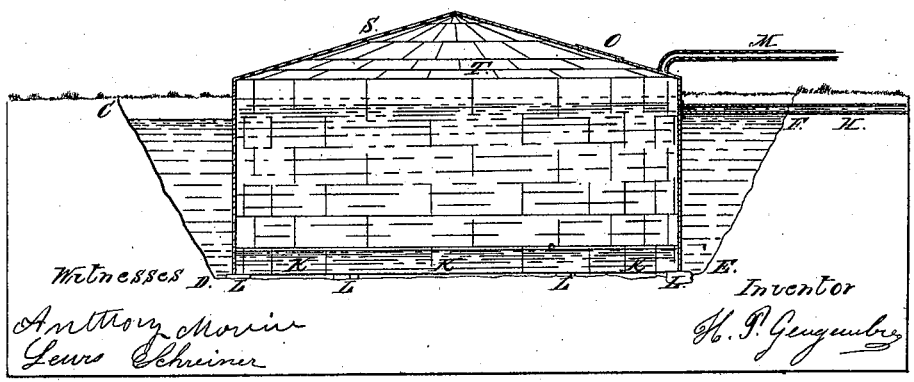
Witnesses
Anthony Morin
Lewis Schreiner
Inventor
H. P. Gengembre

UNITED STATES PATENT OFFICE.

H. P. GENGEMBRE, OF TARENTUM, PENNSYLVANIA, ASSIGNOR TO GEO. W. HOWARD.

IMPROVED METHOD OF STORING OILS.

Specification forming part of Letters Patent No. 34,462, dated February 18, 1862.

*To all whom it may concern:*

Be it known that I, H. P. GENGEMBRE, of Tarentum, in the county of Allegheny and State of Pennsylvania, have invented a certain new and useful Method of Preventing Leakage and Wastage of Oils, of which the following is a full, clear, and exact description, reference being had to the accompanying drawings, which make part of this specification, and in which—

Figure 1 represents a plan or view of a tank for storing oils according to my improved method, and Fig. 2 represents a vertical section through the same at the line A B of Fig. 1. The blue dotted lines in the drawings represent the water which surrounds the tank and the green lines the oil inclosed within it.

My invention, though applicable to the storage and preservation of any of the oils of commerce, is especially adapted and more particularly planned for holding such oils as coal-oil, petroleum or rock oil, naphtha, &c., and is based upon the principle that the difference between the specific gravities of the oils above mentioned and of the water in which the tank is placed is such that when the oil is placed inside of a tank having an open bottom it will float upon the water and the pressure of the two fluids upon the sides of the tank will be counterbalanced.

My improvement consists in a novel method of preventing oils from wastage by storing them in a receptacle, tank, or vessel having tight sides, but open at bottom, said tank being placed in a pond, reservoir, or cistern of water, so that as the oil flows into the tank it will (owing to its being of a less specific gravity) displace a corresponding weight of water, which will escape through the bottom of the tank. By this means the hydrostatic pressure upon the sides of the tank is always balanced, no matter what may be the quantity of oil in the tank, whereby I am enabled to construct a receptacle of large dimensions of slight materials at a comparatively small expense.

In the accompanying drawings, which represent a convenient arrangement for carrying out the objects of my invention, I have shown the tank T as made like a gas-holder; but it may be made rectangular, or of any shape suitable to its location, with equally good effect. This tank is placed in a cistern, pond, or pit, C D E F, the sides of which are made water-tight and of any suitable construction to give the necessary strength to resist the pressure of the fluids contained in the tank and cistern.

The tank T may be of sheet-iron, wood, or any other suitable material, open at bottom and top. In this instance it is represented as covered with a roof, S, as a security against fire, and as having a man-hole or trap-door, O, in the roof. The bottom of the tank rests upon blocks L upon the bottom of the cistern, leaving an opening, K, between the tank and cistern, to allow the water to flow freely into and out of the tank. The oil may be conveyed into the tank through a pipe, M, and be drawn out through another pipe, H, the mouth of which is below the surface of the oil. As the oil enters the tank, it falls upon the water and floats thereupon, displacing the water as it accumulates, and driving it out through the space between the lower edge of the tank and the bottom of the cistern. As the oil is withdrawn from the tank, the hydrostatic pressure will cause the water to rush in and supply its place, and thus keep the pressure upon the sides of the tank always balanced.

I wish to be clearly understood as disclaiming any part of the apparatus herein described when used for any purpose other than that which I have in view; but

What I claim as my invention, and desire to secure by Letters Patent, is—

1. The method herein described of storing oils in order to prevent leakage from hydrostatic pressure.

2. Storing oils in tanks constructed with tight sides, but open at bottom, and immersed in water in order to relieve the sides thereof from hydrostatic pressure, substantially in the manner herein described.

H. P. GENGEMBRE. [L. S.]

Witnesses:
 LEWIS SCHREINER,
 ANTHONY MORIN.